UNITED STATES PATENT OFFICE.

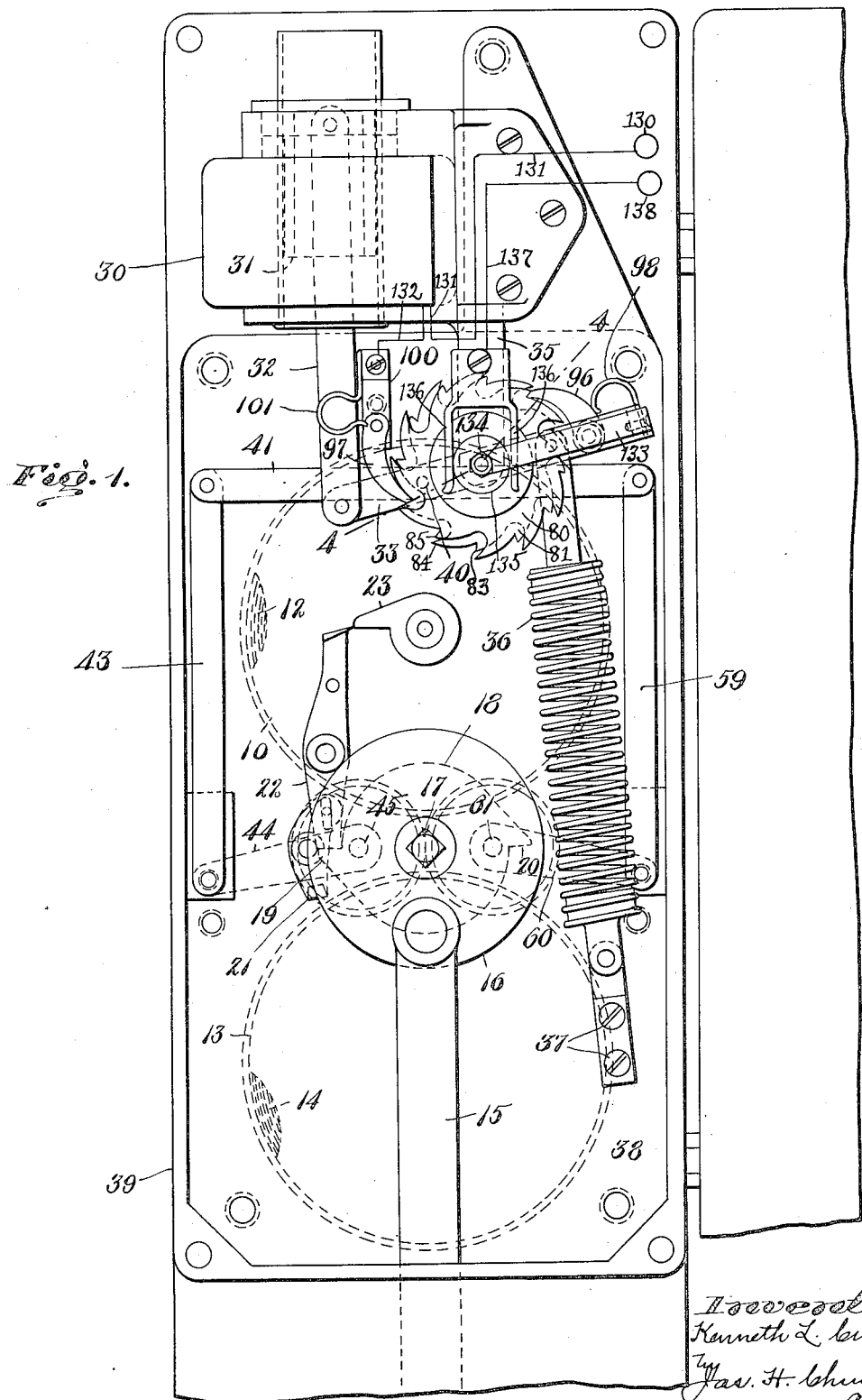

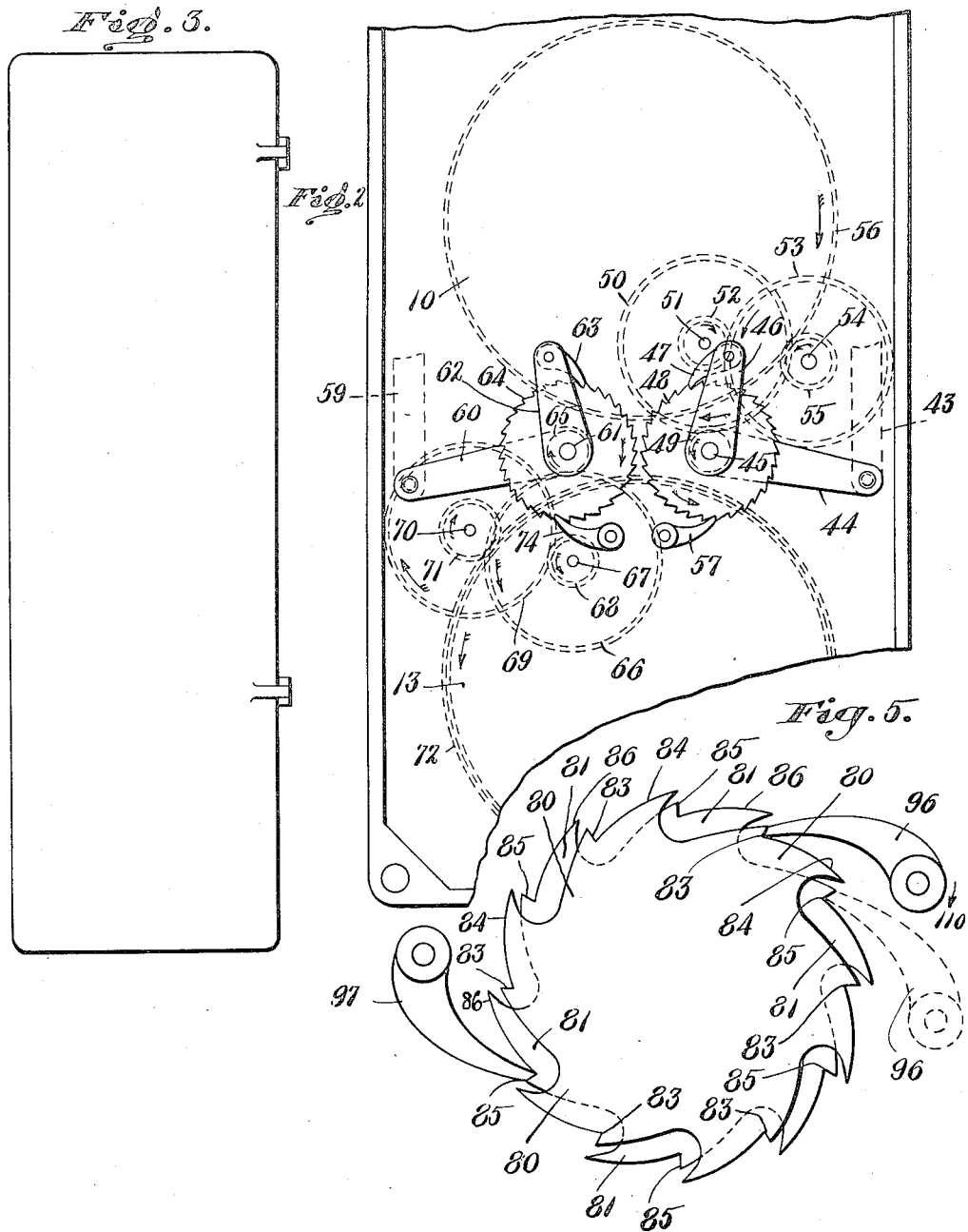

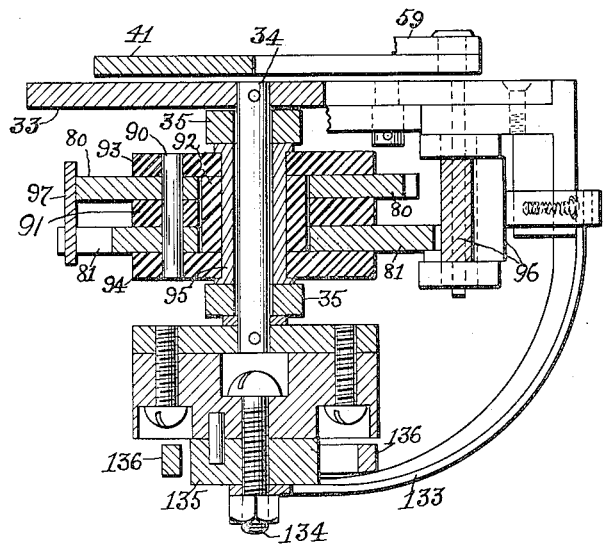

KENNETH L. CURTIS, OF BOSTON, MASSACHUSETTS, ASSIGNOR TO ALBERT AND J. M. ANDERSON MANUFACTURING COMPANY, OF BOSTON, MASSACHUSETTS, A CORPORATION OF MAINE.

REWINDING MECHANISM FOR SPRING-MOTORS.

1,289,682.	Specification of Letters Patent.	Patented Dec. 31, 1918.

Application filed April 10, 1917. Serial No. 161,086.

*To all whom it may concern:*

Be it known that I, KENNETH L. CURTIS, a citizen of the United States, and a resident of Boston, in the county of Suffolk and State of Massachusetts, have invented an Improvement in Rewinding Mechanism for Spring-Motors, of which the following description, in connection with the accompanying drawings, is a specification, like characters on the drawings representing like parts.

This invention relates to a rewinding mechanism for a motor actuated by a spring, weight or the like, and which will be hereinafter referred to as a spring motor.

The invention has for its object to provide a rewinding mechanism which is simple, efficient and reliable and in which a mechanical motor is employed to actuate the spring motor, and an electric motor is employed to actuate the mechanical motor and provide it with energy for operating the spring motor, the operation of the electric motor being governed by the mechanical motor as will be described.

The invention among other uses is especially adapted to be embodied in a time switch or circuit controller of that type in which a spring motor is employed to operate the switch and a second spring motor which constitutes the main spring of a clock or time movement, is employed to control the operation of the spring motor for the switch.

In the present instance I have embodied the invention in a construction which may be preferred by me, and which has provision for rewinding either spring motor alone or both together. and in which the electric motor is controlled by a circuit controller of novel construction as will be described.

These and other features of this invention will be pointed out in the claims at the end of this specification.

Figure 1 is a rear elevation of a sufficient portion of a time switch provided with a rewinding mechanism embodying this invention to enable the latter to be understood.

Fig. 2, an elevation of a portion of the time switch looking at the front thereof with the door or cover removed.

Fig. 3, a front elevation on a smaller scale of the time switch shown in Fig. 2.

Fig. 4, a section on the line 4—4, Fig. 1, looking down to illustrate the circuit controller for the electric motor forming part of the rewinding mechanism herein shown, and Fig. 5, a detail in elevation of the circuit controller shown in Fig. 1.

Referring to the drawing, 10 represents the barrel containing a spring motor 12 which constitutes the main spring of a time movement, and 13 the barrel containing a second spring 14, which constitutes a spring motor which is employed to throw the switch or circuit controller, not shown, of the time switch. The switch is herein represented by the link 15, which operatively connects the said switch with a crank disk 16 mounted on a shaft 17, which has also mounted upon it a second disk 18 provided with substantially diametrically opposite teeth or projections 19, 20, with which coöperate detent levers 21, 22, to hold the disk 18 from rotating and thereby hold the movable member of the time switch in either its closed or open position, until at predetermined intervals of time, the detent levers are moved by a tripping dog 23 to release the spring motor 14 and allow it to rotate the disk 16 a half turn to operate the time switch in a manner well understood.

The tripping dog 23 is rotated by the spring motor or main spring 12 of the time movement, in a manner well understood and after that described in U. S. Patent No. 1,156,126 granted Oct. 12, 1915, to J. M. Andersen to which reference may be had. For sake of distinction, I will hereinafter refer to the spring 12 as the clock spring and spring 14 as the spring motor.

The present invention has for its object to provide means for rewinding the clock spring 12 and the spring motor 14, and in the present instance I have illustrated a construction preferred by me. To this end, an electric motor, preferably in the form of a solenoid 30 has its core 31 connected by a link 32 with one arm of a lever 33 pivoted at 34 in a stationary support 35, and having its arm on the opposite side of the pivot 34 connected with one end of a helical spring 36, which has its other end fixed as by screws 37 to a stationary support, shown as a plate 38 within the casing 39 of the time switch.

The lever 33 is connected as by a pin 40 to a cross bar, link or lever 41, which will be hereinafter designated the whiffle tree, and which has one end operatively connected with the barrel 10 of the clock spring 12 and has its other end operatively connected with the barrel 13 of the spring motor 14, so that movement of the whiffle tree will effect rotation of the barrels 10, 13, to wind up the springs 12, 14, as will be described. In the present instance, the whiffle tree 41 is connected by a link 43 with a lever 44 fast on a rock shaft 45, see Fig. 2, having fast on it a lever 46 carrying a push pawl 47, which engages a ratchet wheel 48, loose on the rock shaft 45 and having affixed to it a pinion 49, which meshes with a gear 50, on a shaft 51 provided with a pinion 52, which meshes with a gear 53 on a shaft 54, provided with a pinion 55 which meshes with a gear 56 on the barrel 10. The ratchet wheel 48 has coöperating with it a holding pawl 57. It will thus be seen that the movement of the link 43 in one direction, namely upward, will effect rotation of the ratchet wheel 48 in the direction indicated by the arrow thereon and through the gearing above described will effect rotation of the gear 56 and barrel 10 in the direction indicated by the arrow thereon, which is the proper direction to wind up the spring 12. On the down movement of the link 43, the levers 44, 46, will be moved to bring the push pawl 47 into engagement with a new tooth of the ratchet wheel 48, which is held from turning backward by the holding pawl 57.

The opposite end of the whiffle tree 41 is connected by similar means with the barrel 13 of the spring motor 14, namely by link 59, lever 60, rock shaft 61, lever 62, push pawl 63, ratchet wheel 64, pinion 65, gear 66, shaft 67, pinion 68, gear 69, shaft 70, pinion 71 and gear 72 on barrel 13.

On the upward movement of link 59, the gear 72 and barrel 13 are rotated in the direction indicated by the arrow thereon to wind up the spring 14, and on the downward movement of said link, the pawl 63 is moved into engagement with a new tooth of the ratchet wheel 64 which is held from turning backward by the holding pawl 74. In the arrangement herein shown, the links 43, 59, are moved downward to engage the pawls 47, 63, with new teeth, by the solenoid core 31 on the down stroke of the latter, and are moved upward to turn the ratchet wheels 48, 64, and wind up the clock spring 12 and spring motor 14 by the spring 36, which latter constitutes one form of mechanical motor for winding up the spring 12, 14, and provision is made for breaking the circuit of the solenoid 30 when its core 31 reaches the end of its down stroke, so as to allow the spring 36 to become active to lift the links 43, 59, and also to move the core 31 upwardly, and when the latter has reached the end of its upstroke, to close the circuit of the solenoid 30 and render it active to move the links 43, 59 downward.

The circuit of the electromagnet or solenoid 30 is governed by a circuit controller preferably of the construction herein shown and as will now be described.

The circuit controller referred to consists of two toothed wheels 80, 81, of like construction and preferably that shown in Figs. 1 and 5. The wheel 80 is provided with a plurality of teeth 83, herein shown as six in number and with a plurality of cams or disengaging devices 84, also six in number and each arranged between two adjacent teeth 83.

The cams 84 have their outer extremities included in a circle of a larger diameter than that in which the ends of the teeth 83 are located.

The ratchet wheel 81 is provided with like teeth 85 and cams 86, and the said wheels are arranged so that their teeth alternate, that is, with a tooth 83 on the wheel 80 between two adjacent teeth 85 on the wheel 81 and vice versa, and with a cam 84 on wheel 80 between two adjacent cams 86 on wheel 81 and vice versa, and with the extremities of the cams 84 on wheel 80 substantially in radial line with the ends of the teeth 85 on wheel 81, and with the extremities of the cams 86 on wheel 81 substantially in radial line with the teeth 83 of wheel 80. As thus arranged, the two ratchet wheels 80, 81, are secured together in fixed relation to rotate as one piece, which is effected in the present instance by a pin 90 of insulating material, see Fig. 4. The wheels 80, 81, are also insulated from each other by a disk 91 of insulating material interposed between the said wheels, which are mounted on a sleeve 92 of insulating material provided with end collars 93, 94 of insulating material and having a metal bushing 95, which is mounted to turn freely on the pivot pin 34 for the lever 33 and which serves to clamp the collars 93, 94 against the sleeve 92. The ratchet wheels 80, 81, have coöperating with them a push pawl 96 and a holding pawl 97, which are made of sufficient width, see Fig. 4, to coöperate with both ratchet wheels as will be described.

The push pawl 96 is carried by the lever 33 and is normally pressed toward the ratchet wheels by a spring 98 carried by the lever 33.

The holding pawl 97 is pivoted to a stationary support 100 and is pressed toward the ratchet wheels by a spring 101. The push pawl 96 is moved in one direction to rotate the ratchet wheels 80, 81, when the magnet 30 is energized and the core 31 is moved downward, and said push pawl is moved in the opposite direction by the spring 36.

The pawls 96, 97, are included in circuit with the electric motor or solenoid 30 and form the terminals of a circuit controller, having as its movable member the ratchet wheels 80, 81, which coöperate with the said pawls to close the circuit of the solenoid 30 when either ratchet wheel is engaged by both pawls, and to open said circuit when one ratchet wheel is engaged with one pawl and the other ratchet wheel is engaged with the other pawl.

As represented in Figs. 1 and 5, the core 31 of the solenoid 30 is at the end of its down stroke and the circuit of the solenoid is open because the holding pawl 97 is in engagement with a tooth 85 of the ratchet wheel 81, and is disengaged from the ratchet wheel 80, and the push pawl 96 is in engagement with a tooth 83 of the ratchet wheel 80 and is disengaged from the ratchet wheel 81, and as these wheels are electrically separated the circuit is open.

As soon as the circuit of the magnet 30 is broken, the spring 36 becomes active and turns the lever 33 on its pivot so as to move the solenoid core 31 on its upstroke and to move the push pawl 96 down or in the direction of the arrow 110, in Fig. 5, and into engagement with the next succeeding tooth, which is a tooth 85 of the ratchet wheel 81, as indicated by the dotted lines in Fig. 5. On the movement of the push pawl 96 from its full line position in Fig. 5 into its dotted line position, the said pawl moves over the cam 84 of the wheel 80 which is between the tooth 83 of the wheel 80 with which it was engaged and the tooth 85 of the wheel 81 next in succession to the tooth 83, and in this movement, the push pawl passes off of the end of the cam 84 and is thrown by its spring 98 into engagement with the tooth 85 of the wheel 81 as represented by dotted lines in Fig. 5. By reference to Fig. 5, it will be seen that with the push pawl 96 in its dotted line position, both pawls are in contact with the ratchet wheel 81 and the circuit of the solenoid or electric motor 30 is completed. As a result, the magnet 30 is energized and attracts its core 31 and moves the latter on its down stroke. On the down stroke of the core 31, the lever 33 is turned on its pivot and the push pawl 96 is moved upward or in the direction opposite to that indicated by the arrow 110 in Fig. 5, the said pawl being moved from its dotted line position into its full line position. As the push pawl 96 is thus moved, it rotates the ratchet wheels 80, 81 as a unit, and in this rotation the ratchet wheel 81 is moved with relation to the holding pawl 97, and the cam 86 next adjacent to the tooth 85 with which the holding pawl 97 is engaged in Fig. 5, acts on said holding pawl and moves it back against the action of its spring 101, until the end of the cam passes under the pawl 97 and the latter is moved by its spring 101 into engagement with the tooth 83 of the wheel 80, thereby opening the circuit of the solenoid at the end of the down stroke of the core 31, for in this case the push pawl 96 is engaged with a tooth of the wheel 81 and the holding pawl 97 is engaged with a tooth of the wheel 80 and said wheels are insulated from each other.

The action of the circuit controller is repeated as long as either of the springs 12, 14, is unwound, and when both springs are unwound to the same extent, the whiffle tree 41 is moved bodily and to the same extent at both ends and both links 43, 59, are simultaneously operated to effect rewinding of the springs 12, 14. If, however, either spring 12 or 14 should be unwound more than the other, the whiffle tree 41 would be moved bodily until one of the springs, as for instance the spring 12 has been rewound, and thereafter the whiffle tree will be moved as a lever with the end connected with the link 43 as a center, and the end connected with the link 59 movable with the lever 33, until the spring 14 has been rewound. The action of the spring 36 upon the rewinding mechanism, and the action of the solenoid upon the spring 36 will be repeated until the spring 36 is overcome by the wound up springs, at which time the rewinding mechanism becomes inactive because the circuit of the solenoid is open, due to the fact that the spring 36 is on its downward travel. This condition might exist for a considerable period of time and will continue until one or both of the springs 12, or 14 has run down sufficiently to allow spring 36 to complete its travel, whereupon the solenoid is energized and the rewinding mechanism is put in commission.

From the above description, it will be observed, that when the lever 33 is moved by the core 31 on the down stroke of the latter, the spring 36 is elongated and thereby provided with energy which is utilized to rewind the springs 12, 14, if the latter are in an unwound condition, and it will further be noticed that the electric motor or solenoid does not rewind the springs 12, 14, but merely provides the mechanical motor or spring 36 with power or energy to perform the work of rewinding the springs 12, 14, and when the electric motor 30 has elongated the spring 36, its circuit is open because the push pawl 96 engages one wheel as 80 and the holding pawl 97 engages the other wheel 81. If now the power of the spring 36 should not be sufficient to overcome either or both of the spring motors 12, 14, the apparatus becomes stalled but no harm can result from the electric current which supplies the solenoid or motor 30, because the circuit of the latter is open and remains open as long as this stalled condition of the mechanical motor or spring 36 exists. When, however, either or both of the spring motors 12, 14, becomes unwound sufficiently to relieve the stalled condition of the mechanical motor 36, then the latter will operate to wind up the spring motors 12, 14, or either of them and also move the push pawl 96 to close the circuit of the solenoid 30. It will thus be seen, that the rewinding of the spring motors 12, 14 or either of them is effected by a mechanical motor, which is provided with power by an electric motor, which is controlled by a circuit controller operated by the mechanical motor.

The circuit of the solenoid may be traced in Figs. 1 and 4 as follows: from a binding post 130 by wire 131 to solenoid 30, thence by wire 132 to holding pawl 97, through one of the wheels 80 or 81 to push pawl 96, spring 98, conductor bar 133, screw 134, metal disk 135, brushes 136 and wire 137 to binding post 138.

I have herein shown the rewinding mechanism as employed for winding up two separate spring motors but it is not desired to limit the invention in this respect, as it may be used with only one spring motor. Furthermore, I have herein shown one embodiment of the invention which is preferred by me, but it is not desired to limit the invention to the particular construction shown.

Claims.

1. The combination with a time switch having a spring motor and a time movement provided with a spring controlling the operation of said spring motor, of a rewinding mechanism for said spring motor and said time movement spring comprising a whiffle tree operatively connected with the said spring motor and time movement spring, a lever pivotally connected with said whiffle tree, a solenoid having its core connected with said lever to move it in one direction, a spring connected with said lever to move it in the opposite direction, a plurality of ratchet wheels insulated from each other and secured together to move as one piece, said ratchet wheels having peripheral teeth spaced apart and having cams between said teeth, with the teeth on each ratchet wheel coöperating with the cams on the other ratchet wheel, a push pawl carried by said lever and of a width sufficient to engage either ratchet wheel, and a holding pawl of a width sufficient to engage either ratchet wheel, said ratchet wheels and pawls coöperating to close the circuit of the solenoid when both of said pawls engage the teeth of either wheel and to open said circuit when one pawl is engaged with one ratchet wheel and the other pawl is engaged with the other ratchet wheel.

2. The combination with a time switch having a spring motor and a time movement provided with a spring and controlling the operation of said spring motor, of a rewinding mechanism for said spring motor and said time movement spring, comprising a whiffle tree operatively connected with said spring motor and with said time movement spring, an electromagnet to move said whiffle tree in one direction, means to move said whiffle tree in the opposite direction, and a circuit controller to automatically open and close the circuit of said magnet and thereby enable the whiffle tree to be moved in opposite directions.

3. The combination with a time switch having a spring motor and a time movement provided with a spring and controlling the operation of said spring motor, of a rewinding mechanism for said spring motor and said time movement spring comprising a device operatively connected with said spring motor and with said time movement spring, and means to move said device to wind up both springs simultaneously and to permit either spring to be wound up independently of the other.

4. The combination with a time switch having a spring motor and a time movement provided with a spring and controlling the operation of said spring motor, of a rewinding mechanism for said spring motor and said time movement comprising a device operatively connected with said spring motor and with said time movement, an electromagnet to move said device in one direction, means to move said device in the opposite direction to rewind said spring motor and said spring, and a circuit controller for said eelctromagnet to automatically open and close the circuit of said electromagnet and thereby enable said device to be moved in opposite directions.

5. The combination with a time switch provided with a spring, of mechanism for rewinding said spring comprising a device operatively connected with said spring, an electric motor to move said device in one direction, means for moving said device in the opposite direction to effect the rewinding of the spring, and a circuit controller for automatically opening and closing the circuit of said electric motor until the spring has been rewound to a definite tension sufficient to overcome said means.

6. The combination with a time switch provided with a spring, of mechanism for rewinding said spring comprising a device operatively connected with said spring, an electric motor to move said device in one direction, a mechanical motor for moving said device in the opposite direction to effect the rewinding of the spring, and a circuit controller for automatically opening and closing the circuit of said electric motor comprising a plurality of ratchet wheels electrically separated and arranged with their teeth in sequence relation, and having cams on each wheel coöperating with the teeth on the other wheel, means for securing said wheels together to rotate as one piece, a push pawl actuated by said mechanical motor and coöperating with said ratchet wheels to rotate the same, and a holding pawl coöperating with said ratchet wheels and with said push pawl to close the circuit of said electro magnet by contact of both pawls with either ratchet wheel and to open said circuit by contact of one pawl with one ratchet wheel and the other pawl with the other ratchet wheel.

7. The combination with a plurality of spring motors, of mechanism operatively connected with said spring motors individually and responsive to the condition of the spring motors to enable them to be rewound individually or simultaneously, an electric motor for operating said winding mechanism in one direction, means for operating said winding mechanism in the opposite direction to wind up said spring motors individually or simultaneously and a circuit controller for said electric motor.

8. The combination with a plurality of spring motors, of mechanism operatively connected with said spring motors individually and responsive to the condition of the spring motors to enable them to be rewound individually or simultaneously, and means controlled by said spring motors for intermittently operating said mechanism.

9. The combination with a spring motor of a mechanical motor operatively connected with said spring motor to wind up the latter when the power of the mechanical motor is greater than the resistance offered by the spring motor, an electric motor operatively connected with said mechanical motor to actuate the latter and provide it with power or energy for winding up the spring motor, and a circuit controller for said electric motor operated by said electric motor to open the circuit of said electric motor and maintain it open when the mechanical motor fails to actuate the spring motor.

10. The combination with a spring motor, of a supplemental spring operatively connected with said spring motor to rewind the latter, an electric motor operatively connected with said supplemental spring to actuate the latter and provide it with energy to actuate the spring motor, and a circuit controller for said electric motor actuated by the latter to open the circuit of the electric motor and maintain it open when the supplemental spring becomes stalled by the spring motor and to close said circuit when the supplemental spring again becomes active to wind up the spring motor.

11. The combination with a spring motor, of a supplemental spring operatively connected with the spring motor to wind up the same, an electric motor to operate the supplemental spring to provide it with energy to effect the rewinding of the spring motor, and a circuit controller for said electric motor to close the circuit of the electric motor when the supplemental spring is effective to wind up the spring motor and to open the said circuit when the supplemental spring becomes ineffective to wind up the spring motor.

12. The combination with a spring motor, of a mechanical motor operatively connected with the spring motor to wind up the latter, an electric motor operatively connected with said mechanical motor, and a circuit controller for said electric motor actuated by the latter and governing the circuit of the electric motor to render the latter inoperative when the mechanical motor becomes inoperative to wind up the spring motor.

13. The combination with a spring motor and means operated by it, of a mechanical motor ineffective to operate said means independently of said spring motor but operatively connected with the latter to store up energy in the same so that the spring motor can function at all times, a solenoid having its core operatively connected with said mechanical motor to store up energy in the latter, and a circuit controller for said solenoid actuated by said mechanical motor.

14. The combination with a spring motor and means operated by it, of a mechanical motor ineffective to operate said means independently of said spring motor but operatively connected with the latter to store up energy in the same, so that the spring motor can function at all times, and a motor operatively connected with said mechanical motor to store up energy in the mechanical motor and controlled in its operation by said spring motor.

15. The combination with a plurality of spring motors, of mechanism operatively connected with said spring motors individually and responsive to the condition of the spring motors to enable them to be rewound individually or simultaneously, means for operating said winding mechanism in one direction to wind up said spring motors individually or simultaneously, and means controlled in its operation by said spring motors for operating said winding mechanism in the opposite direction to store up energy in the said operating means.

16. The combination with a spring motor and means operated by it, of a mechanical motor ineffective to operate said means independently of said spring motor but operatively connected with the latter to store up energy in the same so that the spring motor can function at all times, an electric motor operatively connected with said mechanical motor to store up energy in the latter, and a circuit controller for said electric motor actuated by said mechanical motor.

In testimony whereof, I have signed my name to this specification.

KENNETH L. CURTIS.